(12) United States Patent
Liang et al.

(10) Patent No.: US 7,797,429 B2
(45) Date of Patent: Sep. 14, 2010

(54) METHOD FOR ESTABLISHING PEER-TO-PEER CONNECTION

(75) Inventors: Zhu Liang, Guangdong (CN); Fuzhong Sheng, Guangdong (CN); Baohe Zhang, Guangdong (CN); Nian Liu, Guangdong (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 535 days.

(21) Appl. No.: 11/691,546

(22) Filed: Mar. 27, 2007

(65) Prior Publication Data

US 2007/0288656 A1 Dec. 13, 2007

Related U.S. Application Data

(63) Continuation of application No. PCT/CN2005/001564, filed on Sep. 26, 2005.

(30) Foreign Application Priority Data

Sep. 29, 2004 (CN) .................... 2004 1 0080392

(51) Int. Cl.
G06F 15/16 (2006.01)
G06F 15/173 (2006.01)
H04L 12/28 (2006.01)
(52) U.S. Cl. .................. 709/227; 709/223; 370/422
(58) Field of Classification Search .................. None
See application file for complete search history.

(56) References Cited

U.S. PATENT DOCUMENTS 5,815,710 A * 9/1998 Martin et al. .............. 719/316

| 7,542,475 B2 * | 6/2009 | Bar-Zakai ................ 370/401 |
| 2002/0184358 A1 * | 12/2002 | Traversat et al. .......... 709/223 |
| 2003/0212795 A1 * | 11/2003 | Harris et al. .............. 709/227 |
| 2004/0139228 A1 * | 7/2004 | Takeda et al. ............. 709/245 |
| 2005/0220134 A1 * | 10/2005 | Lin .......................... 370/437 |
| 2005/0243819 A1 * | 11/2005 | Peng et al. ................ 370/389 |

FOREIGN PATENT DOCUMENTS

KR 1020020086040 11/2002
KR 1020040048178 6/2004

* cited by examiner

*Primary Examiner*—Wen-Tai Lin
(74) *Attorney, Agent, or Firm*—Ladas & Parry LLP

(57) ABSTRACT

The embodiment of the present invention provides a method for establishing P2P connection, comprising the steps of: a first terminal initiating connection sends a message to a second terminal to be connected, wherein the message contains the address of the first terminal; the second terminal reads the address of the first terminal initiating connection upon receiving the message, and initiates a P2P connection to the address of the first terminal. The embodiment of the present invention also provides another method for establishing P2P connection, through which both UDP P2P connection and TCP P2P connection can be established. Through the methods provided by the embodiments of the present invention, the terminal to be connected may initiate P2P connection, hence a P2P connection can be initiated by both ends of the connection; furthermore, a P2P connection can be established by using multiple policies through the multiple policy P2P connection establishment method provided by the embodiment of the present invention, thus the P2P connection rate is improved.

3 Claims, 4 Drawing Sheets

METHOD FOR ESTABLISHING PEER-TO-PEER CONNECTION

FIELD OF THE INVENTION

The present invention relates to Peer-to-Peer (P2P) information transmission technology, and particularly, to a method for establishing a P2P connection.

BACKGROUND OF THE INVENTION

P2P connection technology is widely applied on internet for data transmission and download. In a network shown in FIG. 1, in normal cases, when a client has logged in a server and obtained the address of a to-be-connected client, the first client can initiate a P2P connection to the to-be-connected client. A P2P connection establishment process is explained herein with reference to the data download process executed by BitTorrent (BT), as shown in FIG. 2.

BT is an application used for downloading files through P2P connections, which allows a peer to upload data to other peers while downloading data so that the peers may transmit downloaded data to one another. The data download process performed by BT for a peer, taking Peer A as an example, comprises the following steps:

Step 201: acquiring, by the BT client application of Peer A, from internet an information file with ".torrent" as the file name extension, the information file providing the addresses of the tracker(s) that offers BT download service; accessing the tracker(s) by the BT client application of Peer A, uploading the address and download demand of Peer A onto the tracker(s);

Step 202-203: acquiring a corresponding peerlist by the tracker(s) according to the download requested by Peer A, searching the peerlist based on certain policies, choosing several pieces of peer information and sending the peer information to Peer A; the peer information including the peers that offer data download and the peers that demand data upload;

Step 204-205: choosing the peer(s) that offers data download by Peer A according to certain policies upon receiving the peer information, initiating a Transmission Control Protocol (TCP) connection request directly to the peer(s), establishing a P2P connection to the peer(s) and starting to download data; choosing the peer(s) that demands data upload, initiating a TCP connection request directly to the peer(s), establishing a P2P connection to the peer(s) and starting to upload data;

Step 206: reporting upload and download rates and the download result by Peer A to the tracker(s) regularly and obtaining real-time updated peerlist.

BT application has the following disadvantages:

1) BT can only establish TCP based P2P connections for data transmission between peers while TCP can not fulfill the requirements of real-time transmission in certain applications, e.g., real-time multimedia data transmission based on User Datagram Protocol (UDP);

2) more importantly, in the P2P connection establishment process, only the peer that initiates the P2P connection establishment process may initiate a connection, which results in very low connection rate.

In a common P2P connection establishment process in the prior art, it is also true that only the peer that initiates the P2P connection establishment process, not the peer to be connected, may initiate a connection. For example, when a user is connected to internet through a client application and the user initiates a P2P connection to a tracker on internet to download data, only the user will be allowed to initiated the process of establishing the P2P connection to the server, the server, as the terminal to be connected, will not be allowed to initiate a P2P connection to the user. Therefore, if the P2P connection initiated by the user fails to reach the server, or the user fails to initiate the P2P connection, the P2P connection establishment will fail and the connection rate is thus low.

SUMMARY OF THE INVENTION

The embodiments of the present invention provide methods for establishing P2P connection, and both the terminal initiating connection and the terminal to be connected may initiate a P2P connection to each other.

A method for establishing P2P connection includes the following processes:

a first terminal initiating connection sends a message to a second terminal to be connected, wherein the message contains the address of the first terminal;

the second terminal reads the address of the first terminal initiating connection upon receiving the message, and initiates a P2P connection to the address of the first terminal.

Optionally, the first terminal and the second terminal log in a central server, and the process of sending a message by the first terminal to the second terminal includes the following processes: the first terminal sends the message containing the address of the first terminal to the central server; the central server forwards the message containing the address of the first terminal to the second terminal.

Optionally, the P2P connection comprises a UDP P2P connection or a TCP P2P connection.

Another method for establishing P2P connection includes the following processes:

the first terminal sends a connection request to the second terminal through a central server, and receives from the second terminal a first response containing a port type of the second terminal;

if determine that the port type of the second terminal is UDP port, the first terminal informs the second terminal of an IP address/UDP port of the first terminal, and initiates a P2P connection by the second terminal to the IP address/UDP port of the first terminal and terminating the process;

if determine that the port type of the second terminal is a TCP port, the first terminal informs the second terminal of the IP address/TCP port of the first terminal, and the second terminal initiates the P2P connection to the IP address/TCP port of the first terminal.

Optionally, the process of informing the second terminal of the IP address/UDP port of the first terminal and initiating the P2P connection by the second terminal includes:

the first terminal sends a message containing the local IP address/UDP port of the first terminal to the second terminal through the central server;

the second terminal initiates the P2P connection by returning a second response containing the local IP address/UDP port of the second terminal to the local IP address/UDP port of the first terminal upon receiving the message; and the first terminal responds to the P2P connection upon receiving the second response, and establishes the P2P connection to the local IP address/UDP port of the second terminal in the second response.

Optionally, when the first terminal fails to receive the second response, the method further includes the following processes:

the first terminal sends the message containing the public IP address/UDP port of the first terminal, to the second terminal;

the second terminal initiates the P2P connection by returning a third response containing the public IP address/UDP port of the second terminal to the public IP address/UDP port of the first terminal upon receiving the message; and the first terminal responds to the P2P connection upon receiving the third response, and establishes the P2P connection to the public IP address/UDP port of the second terminal in the third response.

Optionally, when the first terminal fails to receive the third response, the method further includes the following processes:

the first terminal sends the message containing the public IP address/UDP port of the first terminal to the second terminal through the central server;

the second terminal initiates a P2P connection by returning a fourth response containing the public IP address/UDP port of the second terminal to the public IP address/UDP port of the first terminal upon receiving the message; and the first terminal responds to the P2P connection upon receiving the fourth response, and establishes the P2P connection to the public IP address/UDP port of the second terminal in the fourth response.

Optionally, when the first terminal fails to receive the fourth response, the method further includes the following processes:

the first terminal sends the message containing the public IP address/UDP port of the first terminal to the second terminal through the central server;

the second terminal sends a fifth response containing the public IP address/UDP port of the second terminal to the first terminal through the central server;

upon receiving the fifth response, the first terminal sends a connection establishment request to the public IP address/UDP port of the second terminal in the fifth response;

if the second terminal receives the connection establishment request, the second terminal initiates the P2P connection by returning a sixth response to the public IP address/UDP port of the first terminal; and the first terminal responds to the P2P connection upon receiving the sixth response, and establishes the P2P connection to the public IP address/UDP port of the second terminal.

Optionally, if the first terminal determines that the first terminal is in a public network or uses a sock5 proxy, the process of informing the second terminal of the IP address/TCP port of the first terminal and initiating a P2P connection to the IP address/TCP port of the first terminal by the second terminal includes the following processes:

the first terminal sends the connection request containing the public IP address/TCP port of the first terminal to the second terminal; and the second terminal connects the public IP address/TCP port of the first terminal in the connection request through TCP.

Optionally, if the first terminal determines that the first terminal is not in a public network or does not use a sock5 proxy, the step D includes the following processes:

the first terminal sends to the second terminal the connection request of which the public IP address/TCP port of the first terminal is set as 0;

upon receiving the connection request, the second terminal determines that the second terminal is in the public network or uses the sock5 proxy, and sends the connection request containing the public IP address/TCP port of the second terminal to the first terminal; and upon receiving the connection request, the first terminal connects the public IP address/TCP port of the second terminal in the request through TCP.

Optionally, when the process of initiating the P2P connection by the second terminal to the IP address/TCP port of the first terminal fails, the method further includes the following processes:

the first terminal accesses the central server, and applies for a transfer channel;

the central server allocates the transfer channel, and sends a channel ID and a corresponding key to the first terminal and the second terminal; and both the first terminal and the second terminal establishes P2P connections to the central server based on the channel ID and the corresponding key provided by the central server.

It can be seen from the foregoing technical scheme that, unlike in the prior art, in the embodiments of the present invention, both the terminal initiating connection and the terminal to be connected may initiate a P2P connection so that the P2P connection can be established when the terminal initiating connection fails to establish the P2P connection, thus the P2P connection rate will be increased.

Furthermore, the UDP connection establishment process given in the embodiments of the present invention not only enables both terminals to initiate a P2P connection, but also allows users who are in the same Local Area Network(LAN) and are connected to internet respectively to establish direct connection through the LAN. Through the TCP connection establishment process provided by the present invention, P2P connection can be initiated by both terminals, which increases P2P connection rate.

In addition, in the TCP connection establishment process provided by the embodiments of the present invention, multiple policies are adopted and multiple connection methods are tried instead of simply initiating a connection by a terminal, hence the node connection rate in P2P technology is improved.

DETAILED DESCRIPTION OF THE INVENTION

In the methods provided by the embodiments of the present invention, when the terminal initiating connection fails to establish a P2P connection to the terminal to be connected, the terminal initiating connection sends a message to the terminal to be connected, so that the terminal initiating connection informs the terminal to be connected of the IP address and the UDP or TCP port of the terminal initiating connection; the terminal to be connected, upon the receipt of the message, sends an instruction to the terminal initiating connection to establish a P2P connection. In such way a P2P connection can be initiated by the terminal to be connected, so that the P2P connection rate is increased.

Figure 1:
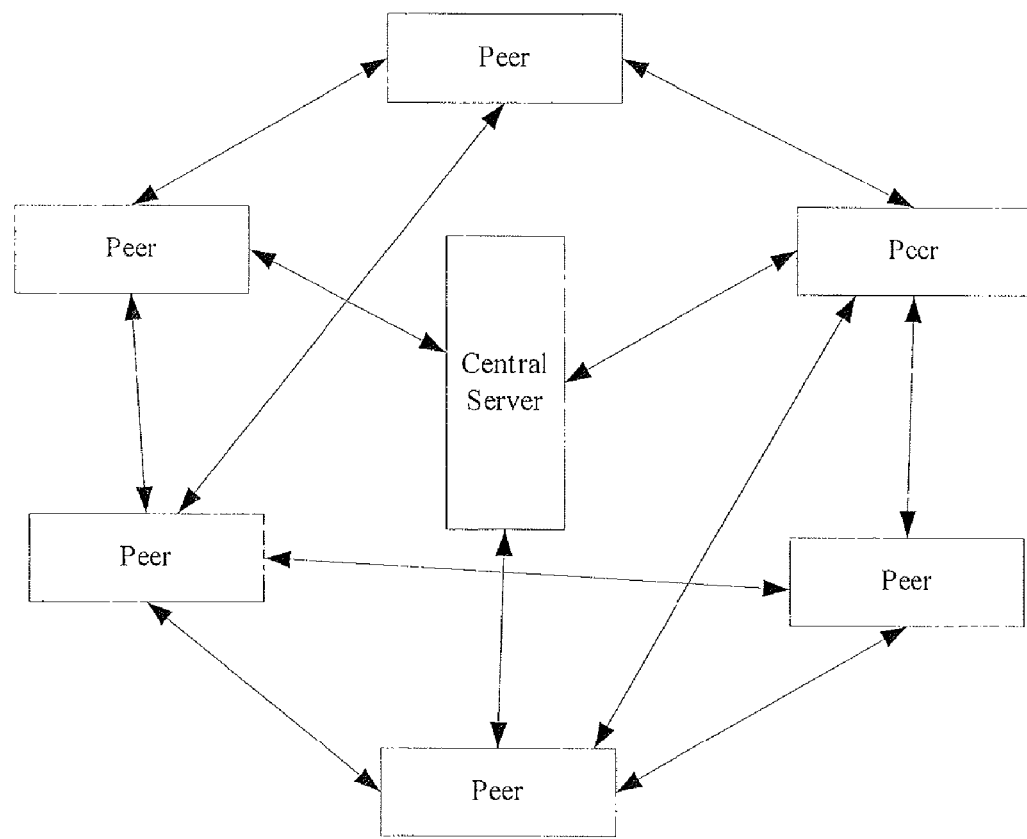
FIG. 1 is a schematic illustrating a network including a central server and multiple peers.
Figure 2:
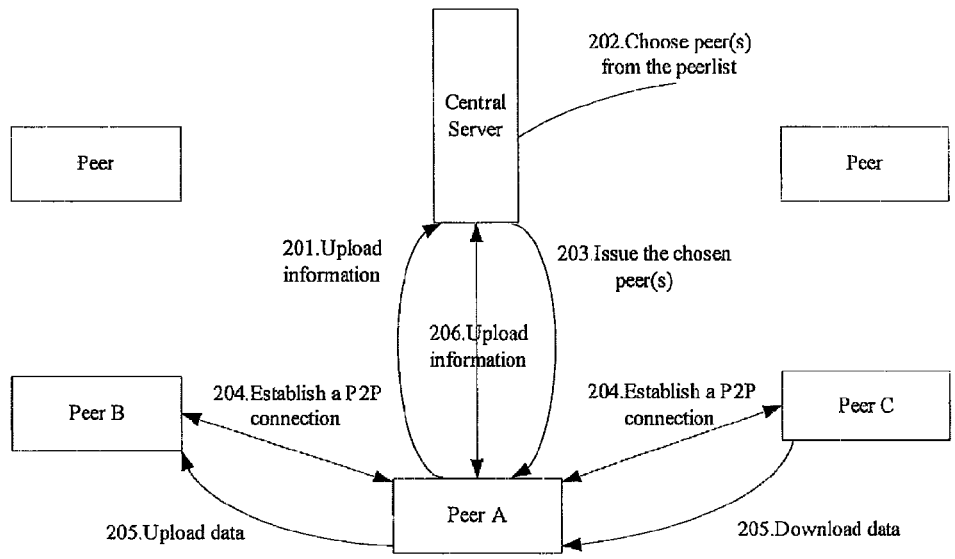
FIG. 2 is a flow chart of the data download process performed by BT application.
Figure 3:
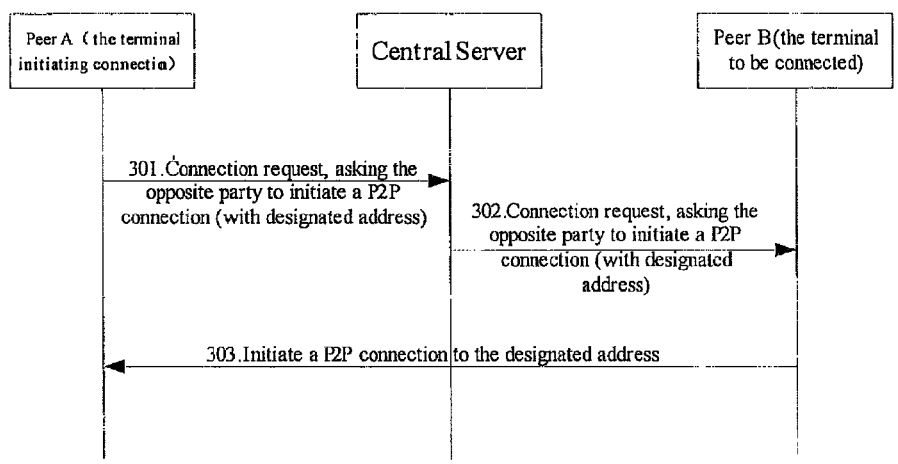
FIG. 3 is a flow chart of the P2P connection establishment process in a first embodiment of the present invention.

For example, in the network shown in FIG. 1, if the terminal initiating connection Peer A fails to initiate a P2P connection, the terminal to be connected Peer B may also initiates a P2P connection through a flow shown in FIG. 3 of a first embodiment of the present invention. The flow comprises the following steps.

Step 301: the terminal initiating connection Peer A sends a message to a central server, requests the terminal to be connected Peer B to initiate a P2P connection; the message carries a designated address to which Peer B shall connect; normally, the designated address may include the public or local address of Peer A.

Step 302: the central server sends the message described in Step 301 to Peer B.

Step 303: upon the receipt of the message, Peer B initiates a P2P connection to the designated address in the message.

Through these steps, a P2P connection to Peer A can be initiated by Peer B when Peer A is unable to initiate a P2P connection to Peer B, e.g., a P2P connection can be established through these steps when Peer A is a server in a public network and needs to establish a P2P connection to a terminal to be connected while it is impossible to establish P2P connection in such case in the prior art.

Moreover, it is easy to see that in the foregoing steps, when the terminal initiating connection is able to send the message directly to the terminal to be connected, the step of sending the message by the central server can be omitted.

A second embodiment of present invention also provides, based on the P2P connection establishment method described in the foregoing description, another P2P connection establishment method in which multiple policies are adopted to increase the P2P connection rate for terminals connected to a public network.

The terminal addresses and ports used for connecting the public network are introduced herein prior to the P2P connection establishment method in which multiple policies are adopted. The public network described in the technical scheme of the second embodiment of the present invention is internet and the private network is LAN. When a terminal is connected to the public network, the public network usually allocates a public IP address to the terminal; therefore the terminal may have a local IP and local port as well as a public IP and public port.

Figure 4:
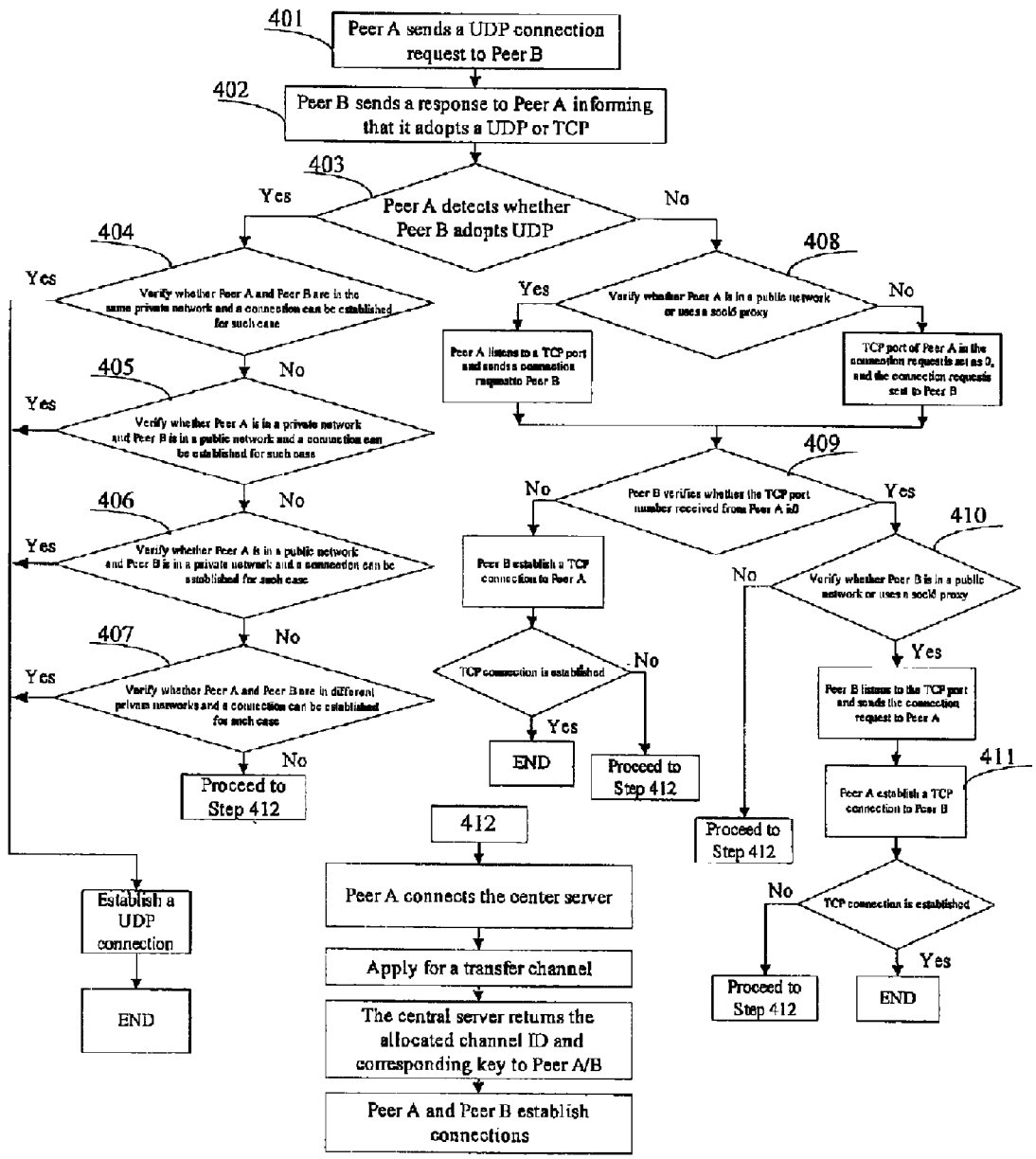
FIG. 4 is a flow chart of the P2P connection establishment process in a second embodiment of the present invention wherein multiple policies are adopted.

In the network shown in FIG. 1, for example, provided a central server is available in the network and user terminals may obtain services from the central server after having logged in. Suppose that both Peer A and Peer B have logged in the central server, Peer A needs to establish a P2P connection to Peer B for a file transmission, so the central server sends the public IP address of Peer B to Peer A. As shown in FIG. 4 of the second embodiment of the present invention, the establishment of the P2P connection between Peer A i.e. the terminal initiating connection, and Peer B i.e. the terminal to be connected, comprises the following steps.

Step 401: Peer A listens to the external network to obtain the public IP address and UDP port of Peer A (A_Public_IP: A_Public_Port), which are the public IP address and UDP port allocated to Peer A when Peer A is connected to the public network; Peer A sends a connection request to Peer B through the central server.

Step 402: Peer B verifies whether Peer B adopts UDP transmission upon the receipt of the connection request from the central server; and Peer B listens to the external network, if Peer B adopts UDP transmission, to obtain the public IP address and UDP port of Peer B (B_Public_IP: B_Public_Port), sends a connection accept request to Peer A through the central server, and informs Peer A through the UDP port number that Peer B adopts UDP; or, Peer B sends a connection accept request, if Peer B adopts TCP transmission, to Peer A through the central server and informs Peer A that Peer B adopts TCP through a port number.

Step 403: proceed to Step 404 if Peer A detects that Peer B adopts UDP transmission upon the receipt of the connection accept request, attempting to establish a P2P connection to Peer B through UDP; or, proceed to Step 408 if Peer A detects that Peer B adopts TCP transmission upon the receipt of the connection accept request, attempting to establish a P2P connection to Peer B through TCP.

Figure 5:
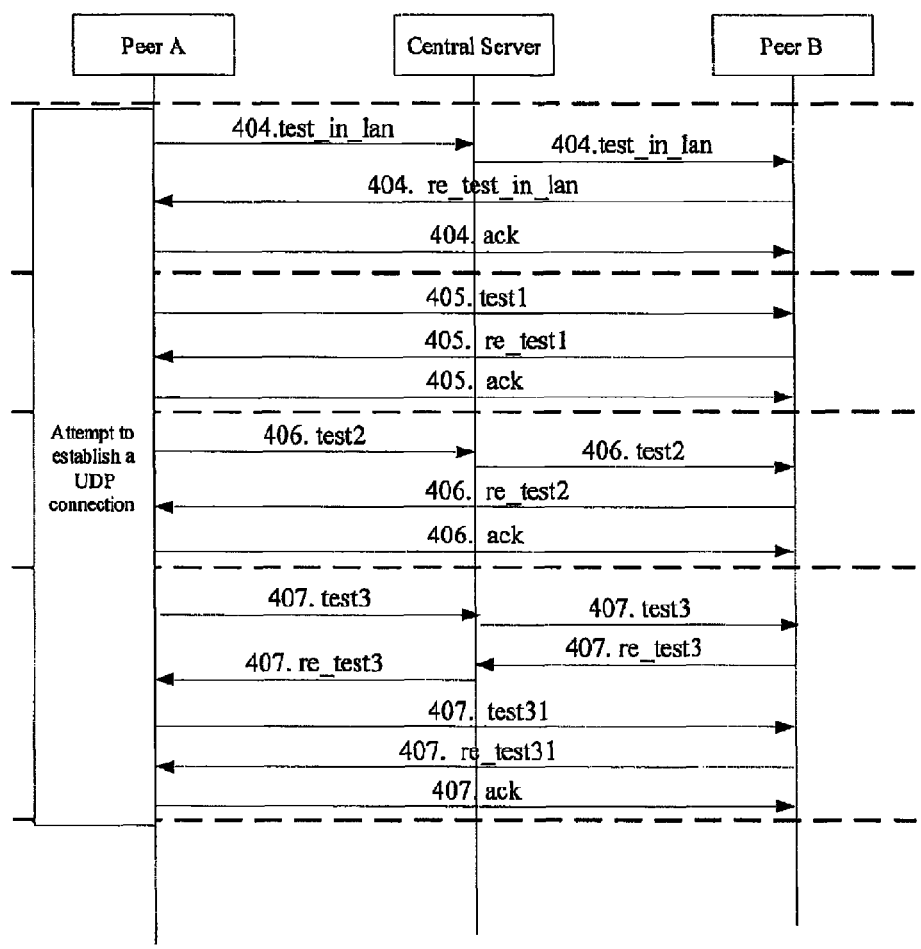
FIG. 5 is a flow chart of a P2P connection establishment process performed based on UDP in a third embodiment of the present invention.

Peer A determines, through Steps 401-403, whether the protocol adopted for establishing the P2P connection to Peer B is UDP or TCP; the UPD based P2P connection to Peer B is established by Peer A in both FIG. 4 and FIG. 5, in which corresponding steps are marked with same numbers.

Step 404: when Peer A and Peer B are in one private network, attempt to establish a connection between Peer A and Peer B.

In the Step 404, Peer A listens to A_local_IP:A_local_Port, generates a test_in_lan message and sends the test_in_lan message to Peer B through the central server; the designated address contained in the test_in_lan message carries A_local_IP:A_local_Port, and the message requests Peer B to return a re_test_in_lan response directly to A_local_IP:A_local_Port of Peer A.

Peer B listens to B_local_IP:B_local_Port upon the receipt of the test_in_lan message and returns directly to A_local_IP: A_local_Port a re_test_in_lan message which carries B_local_IP:B_local_Port, the re_test_in_lan message is used for initiating a P2P connection by Peer B i.e. the terminal to be connected.

If Peer A receives the re_test_in_lan message, Peer A will send an ACK message directly to B_local_IP:B_local_Port; if Peer A fails to receive the re_test in lan message, proceed to Step 405.

An attempt is made in Step 404 to establish the P2P connection between the private addresses of Peer A and Peer B, so that a direct LAN connect, instead of a circuitous internet connection, can be established between the peers in the same LAN when the peers are connected to internet respectively.

Step 405: when Peer A is in the private network and Peer B is in the public network, Peer A attempts to establish a connection at a public address.

In Step 405, Peer A sends a test message Test 1 directly to Peer B, the message contains A_Public_IP:A_Public_Port and requests Peer B to return a response re_test1 directly to A Public_IP:A_Public_Port.

Peer B returns a response re_test1 directly to A_Public_IP: A_Public_Port upon the receipt of Test 1.

If Peer A receives the re_test1, Peer A sends an ACK message directly to B_Public_IP:B_Public_Port to establish a connection; if Peer A fails to receive the re_test1, proceed to Step 406.

Step 406: attempt to establish a connection when Peer A is in the public network and Peer B is in the private network.

In Step 406, Peer A sends a test message Test 2 directly to Peer B through the central server, the message contains A_Public_IP:A_Public_Port and requests Peer B to return a response re_test2 directly to A_Public_IP:A_Public_Port.

Peer B, upon the receipt of Test 2, returns a response re_test2 directly to Peer A to initiate a P2P connection.

If Peer A receives the re_test2, Peer A sends an ACK message directly to B_Public_IP:B_Public_Port to establish a connection; if Peer A fails to receive the re_test2, process to Step 407.

Step 407: when Peer A and Peer B are in different private networks, attempt to establish a P2P connection between Peer A and Peer B through the public network.

In Step 407, Peer A initiates a test message Test 3 and sends the message through the central server to Peer B at B_Public_IP:B_Public_Port, the message requests Peer B to return a response re_test3 through the central server to Peer A at A_Public_IP:A_Public_Port.

Peer B sends a response re_test3, containing B_Public_IP:B_Public_Port, through the central server to Peer A.

Peer A, upon the receipt of re_test3, sends a message Test 31 directly to Peer B at B_Public_IP:B_Public_Port.

If Peer B receives Test 31 Peer B returns a response re_test3 to Peer A; if Peer B fails to receive Test 31, proceed to Step 412.

If Peer A receives the re_test3, Peer A sends an ACK message directly to B_Public_IP:B_Public_Port to establish a connection; if Peer A fails to receive the re_test3, proceed to Step 412.

In Steps 404-407, when Peer B receives the ACK message sent by Peer A and returns an Answer message to Peer A, it can be deemed that a UDP connection has been established and a UDP channel will be set up to transmit data.

Or when Peer A receives the Answer message sent by Peer B, it can be deemed that a UDP connection has been established and a UDP channel will be set up to transmit data.

Steps 404-407 explain the UDP based P2P connection establishment process wherein the ports refer to UDP ports; the four Steps provided in UDP modes to establish the P2P connection increases the connection rate of UPD based P2P connection.

Step 408: Peer A attempts to establish a connection through TCP, in Step 408, Peer A first verifies whether Peer A itself is in the public network, or verifies, according to a application settings file (e.g., a configuration file), whether Peer A uses a sock5 proxy at present; if Peer A is in the public network or uses a sock5 proxy, Peer A listens to a TCP port (A_Public_Port TCP) and sends a connection request to Peer B, the designated address field in the connection request contains A_Public_IP:A_Public_Port_TCP; or, if the Peer A neither locates in the public network nor uses a sock5 proxy, the IP address and TCP port of Peer A in the designated address fields in the connection request are set as 0, indicating that A is in a private network, and the connection request is sent to Peer B.

The step of verifying by Peer A whether Peer A is in the public network further includes the following steps: determine that the IP address of Peer A is not a local address, i.e., detect that the IP address does not fall into the range of 192.168.*.*, 10.1.**, 172.(16-31).*.* or 169.*.*.*, and determine that the IP address of Peer A is a public address; The local IP address range is obtained from experiences and covers the most of possible local IP addresses.

Step 409: upon receiving the connection request, Peer B verifies whether the IP address and TCP port in the designated address fields in the request are set as 0, and if the fields are set as 0, proceed to Step 410; otherwise Peer B directly connects A_Public_IP:A_Public_Port_TCP, the values of which are contained in the designated address field in the request, through TCP to establish a connection from Peer B to Peer A; when the connection establishment fails, proceed to Step 412 (initiating a connection by Peer A).

Step 410: Peer B verifies whether Peer B is in the public network or uses a sock5 proxy; if Peer B is in the public network or uses a sock5 proxy, Peer B listens to a TCP port and sends to Peer A a connection request which contains B_Public_IP: B_Public_Port_TCP in the designated address; if the Peer B neither locates in the public network nor uses a sock5 proxy, determine that Peer B is in the private network and proceed to Step 412.

Step 411: upon receiving the connection request, Peer A connects B_Public_IP:B_Public_Port_TCP containing in the designated address in the connection request through TCP so as to establish a connection from Peer A to Peer B, and, if the connection establishment fails, proceed to Step 412.

Steps 408-411 describes the TCP based P2P connection establishment process including the process of initiating the P2P connection by Peer A i.e. the terminal initiating connection, and the process of initiating the P2P connection by Peer B i.e. the terminal to be connected.

Step 412: set up a transfer channel through the central server to establish a connection between the peers; similar to the method in the prior art of establishing P2P connection by setting up transfer channel, Step 412 includes:

Peer A connects the central server and applies for a room, which is also referred to as a transfer channel;

the central server returns the allocated channel ID and corresponding key to Peer A, and sends the channel ID and the corresponding key to Peer B;

Peer A and Peer B establish connections based on the channel ID and corresponding key respectively to the channel provided by the central server so as to establish a P2P connection between Peer A and Peer B.

The process in Step 412 is performed based on UDP service if Step 412 is taken directly after Step 407, or based on TCP service if Step 412 is taken directly after Step 408, i.e., the ports used in Step 412 are of the same type as the ports used in Steps prior to Step 412.

Through the foregoing steps of establishing a connection between two terminals, two terminals may attempt to establish a connection through multiple ways, not only the terminal that initiate the whole process, but also the terminal to be connected can initiate the connection, hence the connection rate is remarkably increased.

The foregoing is only preferred embodiments of the present invention and is not for use in limiting this invention, any modification, equivalent replacement or improvement made under the invention is included in the protection scope of the present invention.

The invention claimed is:

1. A method for establishing Peer-to-Peer (P2P) connection, comprising the following computer-implemented steps:
   sending, by a first terminal, a connection request to a second terminal through a central server, and receiving from the second terminal a first response containing a port type of the second terminal;
   determining, by the first terminal, whether the port type of the second terminal is User Datagram Protocol (UDP) port or a Transmission Control Protocol (TCP) port;
   if determining that the port type of the second terminal is User Datagram Protocol (UDP) port, sending, by the first terminal, a message containing the local IP address/UDP port of the first terminal to the second terminal through the central server; returning, by the second terminal, a second response containing the local IP address/UDP port of the second terminal to the local IP address/UDP port of the first terminal upon receiving the message; and responding, by the first terminal, to the P2P connection upon receiving the second response, and establishing the P2P connection to the local IP address/UDP port of the second terminal in the second response;
   if determining that the port type of the second terminal is a Transmission Control Protocol (TCP) port, informing, by the first terminal, the second terminal of the IP address/TCP port of the first terminal, and sending, by the second terminal, a connection request to the IP address/TCP port of the first terminal to establish the P2P connection;

wherein when the first terminal fails to receive the second response, the method further comprising the following computer-implemented steps:

sending, by the first terminal, the message containing the public IP address/UDP port of the first terminal, to the second terminal;

returning, by the second terminal, a third response containing the public IP address/UDP port of the second terminal to the public IP address/UDP port of the first terminal upon receiving the message; and responding, by the first terminal, to the P2P connection upon receiving the third response, and establishing the P2P connection to the public IP address/UDP port of the second terminal in the third response.

2. The method of claim 1, when the first terminal fails to receive the third response, further comprising the following computer-implemented steps:

sending, by the first terminal, the message containing the public IP address/UDP port of the first terminal to the second terminal through the central server;

returning, by the second terminal, a fourth response containing the public IP address/UDP port of the second terminal to the public IP address/UDP port of the first terminal upon receiving the message; and responding, by the first terminal, to the P2P connection upon receiving the fourth response, and establishing the P2P connection to the public IP address/UDP port of the second terminal in the fourth response.

3. The method of claim 2, when the first terminal fails to receive the fourth response, further comprising the following computer-implemented steps:

sending, by the first terminal, the message containing the public IP address/UDP port of the first terminal to the second terminal through the central server;

sending, by the second terminal, a fifth response containing the public IP address/UDP port of the second terminal to the first terminal through the central server;

upon receiving the fifth response, sending, by the first terminal, a connection establishment request to the public IP address/UDP port of the second terminal in the fifth response;

if the second terminal receives the connection establishment request, initiating, by the second terminal, the P2P connection by returning a sixth response to the public IP address/UDP port of the first terminal; and responding, by the first terminal, to the P2P connection upon receiving the sixth response, and establishing the P2P connection to the public IP address/UDP port of the second terminal.

* * * * *